W. A. COMPTON.

EMBOSSING WOOD.

No. 10,685. Reissued Feb. 9, 1886.

Witness:
L. Lee
Henry J. Theberath.

Inventor:
William A. Compton,
per Crane & Miller, Attys.

N. PETERS, Photo-Lithographer, Washington, D. C.

UNITED STATES PATENT OFFICE.

WILLIAM A. COMPTON, OF LIBERTY CORNER, NEW JERSEY.

EMBOSSING WOOD.

SPECIFICATION forming part of Reissued Letters Patent No. 10,685, dated February 9, 1886.

Original No. 331,770, dated December 8, 1885. Application for reissue filed December 21, 1885. Serial No. 186,388.

DIVISION A.

*To all whom it may concern:*

Be it known that I, WILLIAM A. COMPTON, a citizen of the United States, residing in Liberty Corner, Somerset county, New Jersey, have invented certain new and useful Improvements in Wood-Embossing, fully described and represented in the following specification and the accompanying drawings, forming a part of the same.

This invention consists in an embossing tool for producing ornamental elevations and depressions upon the surface of planed wood without removing any of the substance of the wood; and it consists in a tool combining a cutting and pressing implement, the cutters being constructed with sharp edges, so as to sever the fibers, and being elevated above the pressing-surface, so as to act in advance of the same during the operation of the tool. The tool thus operates to depress portions of the embossed surface by severing the fibers of the wood where thus depressed, so that the material may be sunk to the desired level without tearing the woody fibers. Such a construction may be used to operate successfully upon flat surfaces of boards or the faces of worked moldings, whereas the pressure of any kind of die without my cutting-projections almost certainly tends to split and roughen the surface adjacent to the depressed parts.

Figure 2:
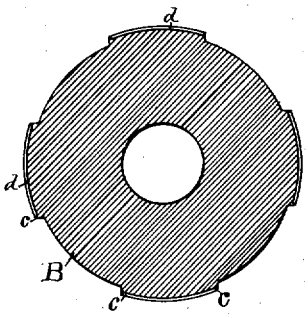
Figure 1:
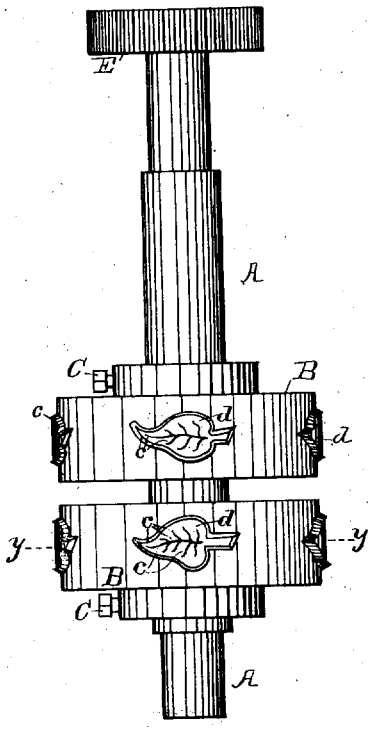
Figure 3:
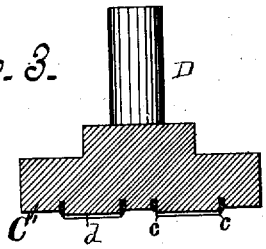

In the drawings, Figure 1 is a side elevation of a rotary shaft, A, provided with two pressing-rollers, B, secured to the shaft by set-screws C. Fig. 2 is a section of one of the rollers on line *y y* in Fig. 1. Fig. 3 is a section on line *x x* in Fig. 4, which figure shows the embossing-surface of a square die provided with four raised surfaces, *d*, and cutting-edges *c*.

The roll B is represented in Fig. 1 with a raised surface, *d*, corresponding in form to a lilac leaf, and with cutting-edges *c* around the margin of such leaf and at the mid-rib and principal veins thereof.

As shown in Fig. 2, the cutting-edges are represented as integral with the roller, and have a greater radius than the surfaces B or *d*, thus penetrating the wood first when applied thereto with pressure, and making the operation of embossing with such tools a progressive process, the fibers at the margin of the design being first cut through, and the raised surfaces *d* then operating to depress such cut surface.

Figure 4:
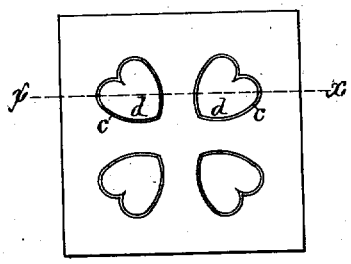

In Figs. 3 and 4 is shown the application of the cutting-edges to a flat embossing-tool the embossing-figures being shown of heart shape in Fig. 4. C′ is the normal surface of the tool; D, a shank for holding the same in a pressing-machine; *d*, the raised embossing-surface, and *c c* the projecting cutting-edges, and such tool is intended to be pressed upon the wood by reciprocating mechanism, the wood being advanced, after each impression, the desired amount.

The cutters are shown in Fig. 3 as inserted in the substance of the tool, and as they project beyond the raised surface *d*, they operate in advance of such surfaces to cut the fibers, which are subsequently depressed.

As the principal function of the cutting-edges is to sever the fibers with a clean cut, instead of tearing and splintering them when forced to an abrupt change of level, it is obvious that they may be used to exercise another function, as in producing clean ornamental lines, in place of the sloping hollows used at similar points in embossed designs. Thus, by the use of the construction shown in Figs. 1 and 2, the mid-ribs of the leaves forming the embossed pattern are formed by clean cuts in the wood, instead of sloping the surface of the wood adjacent to such ribs. The cuts thus made by my cutting-edges may not represent the natural object, a leaf, so correctly as a V-shaped hollow; but it produces, conventionally, an imitation of a kind that is well adapted to the texture of the wood and less liable to rupture and roughen the surface.

I am aware that many devices have been made for embossing wood, as by operating on the end of the grain, and by corrugating or grooving the background; but in any method heretofore applied to emboss wood across the grain, as upon the surface of boards or moldings, the product is sure to be more or less splintered and roughened by the tearing of the fibers, if any abrupt change of level is required.

I am also aware that so-called "sharp corners" have been formed on embossing-tools, to press the fibers down without splintering. Such corners can never have an angle less than ninety degrees, and have never been constructed to sever the fibers (as in my invention) before pressing the same to a different level, while my cutting-edges may be made as thin or sharp as chisels, and by projecting above the surface of the embossing-tool operate in advance of the latter to prepare the wood to be pressed without rupture.

The relative projections of the embossing-surface *d* and cutters *c* above the general face of the tool are plainly shown in the figures, and indicate clearly how the cutters act upon the wood in advance of the embossing-tool.

I am aware that cutters have been used separately from an embossing-tool in a process in which the surface of the wood was largely cut away; but my invention consists in combining the cutting-edges with the raised surfaces of the embossing-tool, so that I can effect in one operation what heretofore required two.

My invention also completes the embossing or ornamenting process without the removal of any of the woody fibers whatever.

The embossing-roller shown herein may be used in any machine adapted to rotate the same with pressure upon the woody surface, or in a wood-planing machine, as specifically claimed by me in a separate patent application, and when thus used may be rotated by a pulley or gear, E, or by the mere contact of the wood moved beneath it.

I disclaim herein the subject-matter of Division B of this reissue, patented of even date herewith, in which the cutters are claimed in combination with raised embossing-surfaces, and, Having distinguished my invention from previous constructions, I claim the same in the following manner:

1. The combined cutting and embossing tool for embossing wood, constructed with the cutters *c* applied to the margin of the embossing-surfaces, and operated substantially as and for the purpose set forth.

2. The combined cutting and embossing tool for embossing wood, constructed with a raised embossing-surface and a projecting cutting-edge affixed to the tool around the entire margin of such raised surface.

3. The combined cutting and embossing tool for embossing wood, having an embossing-surface provided with a projecting cutting-edge around its margin and upon a line or lines within the said margin.

In testimony whereof I have hereunto set my hand in the presence of two subscribing witnesses.

WILLIAM A. COMPTON.

Witnesses:
W. F. D. CRANE,
F. S. BAYLES.